(12) United States Patent
Grosse-Budde

(10) Patent No.: US 9,096,165 B2
(45) Date of Patent: Aug. 4, 2015

(54) METHOD AND DEVICE FOR GENERATING NOISE IN THE VEHICLE INTERIOR AND VEHICLE EXTERIOR OF A MOTOR VEHICLE

(71) Applicant: Dr. Ing. h.c. F. Porsche Aktiengesellschaft, Stuttgart (DE)

(72) Inventor: Daniel Grosse-Budde, Friolzheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 125 days.

(21) Appl. No.: 13/971,907

(22) Filed: Aug. 21, 2013

(65) Prior Publication Data
US 2014/0055258 A1 Feb. 27, 2014

(30) Foreign Application Priority Data
Aug. 24, 2012 (DE) .......................... 10 2012 107 814

(51) Int. Cl.
*B60Q 1/22* (2006.01)
*B60Q 5/00* (2006.01)
*G10K 9/00* (2006.01)
*H04R 1/28* (2006.01)
*G10K 9/12* (2006.01)
*G10K 9/22* (2006.01)
*G10K 11/22* (2006.01)

(52) U.S. Cl.
CPC *B60Q 5/008* (2013.01); *G10K 9/00* (2013.01); *G10K 9/12* (2013.01); *G10K 9/22* (2013.01); *G10K 11/22* (2013.01); *H04R 1/28* (2013.01)

(58) Field of Classification Search
CPC .......... B60Q 5/00; B60Q 5/008; B60R 11/02; G10K 15/00; G10K 15/02; G10K 15/11
USPC .......................................................... 340/463
See application file for complete search history.

(56) References Cited

U.S. PATENT DOCUMENTS

| | | | |
|---|---|---|---|
| 5,635,903 A | 6/1997 | Koike et al. | |
| 6,600,408 B1 * | 7/2003 | Walter et al. ............... | 340/384.1 |
| 6,644,436 B2 | 11/2003 | Hofmann et al. | |
| 7,650,001 B2 * | 1/2010 | Yasushi et al. .................. | 381/61 |
| 8,045,725 B2 | 10/2011 | Theobald et al. | |

(Continued)

FOREIGN PATENT DOCUMENTS

| | | |
|---|---|---|
| DE | 197 01 801 | 7/1998 |
| DE | 100 16 104 | 10/2001 |

(Continued)

OTHER PUBLICATIONS

German Search Report of Jun. 6, 2013.

*Primary Examiner* — Eric M Blount
(74) *Attorney, Agent, or Firm* — Gerald E. Hespos; Michael J. Porco; Matthew T. Hespos (57) ABSTRACT

A method is provided for generating noise in an interior and exterior of a motor vehicle in which a control unit is provided which can be activated and which is operatively connected to a noise generator. The noise generator is connected to at least one noise emitting device (3). The noise emitting device (3) is mounted underneath a hood of the motor vehicle, and is connected to the vehicle interior via at least one hose with at least one sound transmitting element. Sound waves are extracted from the noise emitting device (3) and are transmitted into the vehicle interior.

16 Claims, 7 Drawing Sheets

(56) References Cited

U.S. PATENT DOCUMENTS

| | | | |
|---|---|---|---|
| 2004/0094112 A1* | 5/2004 | Hoffmann et al. | 123/184.57 |
| 2007/0295553 A1* | 12/2007 | Ochi et al. | 181/18 |
| 2010/0245069 A1 | 9/2010 | Noro | |
| 2010/0329477 A1* | 12/2010 | Park et al. | 381/86 |
| 2012/0106748 A1* | 5/2012 | Peachey et al. | 381/61 |
| 2012/0299718 A1* | 11/2012 | Yoshino et al. | 340/466 |
| 2013/0188806 A1* | 7/2013 | Tada | 381/86 |

FOREIGN PATENT DOCUMENTS

| | | |
|---|---|---|
| DE | 102 12 257 | 9/2002 |
| DE | 10 2010 014 819 | 11/2010 |
| DE | 10 2010 007 051 | 8/2011 |
| EP | 1 870 592 | 12/2007 |
| EP | 1 936 605 | 6/2008 |
| FR | 2 892 554 | 4/2007 |
| JP | 07182587 | 7/1995 |
| JP | 07199952 | 8/1995 |
| JP | H07199952 | 8/1995 |
| JP | H07322403 | 12/1995 |
| JP | 2008062718 | 3/2008 |
| WO | 03/100764 | 12/2003 |
| WO | 03100764 | 12/2003 |

\* cited by examiner

METHOD AND DEVICE FOR GENERATING NOISE IN THE VEHICLE INTERIOR AND VEHICLE EXTERIOR OF A MOTOR VEHICLE

CROSS REFERENCE TO RELATED APPLICATION

This application claims priority under 35 USC 119 to German Patent Appl. No. 10 2012 107 814.9 filed on Aug. 24, 2012, the entire disclosure of which is incorporated herein by reference.

BACKGROUND

1. Field of the Invention

The invention relates to a method and a device for generating noise in the vehicle interior and vehicle exterior of a motor vehicle.

2. Description of the Related Art

What is referred to as sound design for motor vehicles has, for many reasons, become a problem for the manufacturers of motor vehicles. On the one hand it is conceivable that an engine noise of a motor vehicle does not please a potential driver of the motor vehicle in terms of its form and the driver may like to change the noise that can be heard in the vehicle interior of the motor vehicle. For example, a user might like the engine sound that can be heard in the interior of the motor vehicle to be somewhat more sporty or somewhat quieter than has been provided hitherto. On the other hand, there are always wide ranging limiting values for external vehicle noise that have to be complied with. Thus, engine noise or other acoustic indications of driving states, such as speed or acceleration are manipulated in a targeted fashion in modern passenger cars.

In addition, motor vehicles are being developed increasingly with electric motor drives. These electric vehicles, of course, have extremely low noise emissions. However, this low noise emission has a disadvantageous safety aspect that should not be underestimated. These vehicles often are so quiet that they are not heard by a passersby or playing children when they approach. In particular, in the case of playing children noise from approaching vehicles is stored in the subconscious as an approaching danger. If a vehicle then approaches almost without any driving noise, the child will not perceive the vehicle or will perceive it too late. This can easily lead to accidents. On the other hand, motor vehicles have an entirely specific driving noise, exhaust noise and engine noise that is responsible, in a significant way, for the feeling of wellbeing of the driver and of the vehicle occupants. The feeling of wellbeing of the driver in turn makes quite a significant contribution to the vehicle being controlled in a safe way, and therefore contributes to general road safety. Accordingly, acoustic perception is an important safety factor.

The above-mentioned aspect also occurs in hybrid vehicles, and a driver perceives different noise in various driving modes that differ from the known, conventional driving noise, especially when the vehicle is driven exclusively via the electric motor.

DE 100 16 104 discloses a device for emitting noise to a passenger compartment of a motor vehicle. In this context, a resonance body is fit onto a signal source that is made available. The surface of the signal source forms one of the walls of the resonance body to which a line and further means for passing a noise into the passenger compartment are connected.

DE 10 2010 007 051 discloses a method and a device for generating sound in vehicles without an internal combustion engine. In this context, values for the parameters of the sound and frequency are selected as a function of the time, the position of the vehicle, the speed of the vehicle and the acceleration of the vehicle and are used to characterize the generation of sound. Differentiated irradiation toward the inside and toward the outside takes place during the generation of sound.

EP 1 936 605 discloses a sound transmitting device for transmitting sound of an operational noise of a motor vehicle, namely an air filter noise, into the vehicle interior of the motor vehicle. The presented sound transmitting device comprises a transmitting line for transmitting the noise from the noise source into the vehicle interior. The transmitting line is formed at least partially by at least one component that already is present independent of the sound transmission on the motor vehicle.

U.S. Pat. No. 5,635,903 describes a noise generator for electrical vehicles. The noise generator generates a noise that is emitted into the vehicle interior of the motor vehicle. Amplifiers and loudspeaker units also are provided to permit the emission.

WO 03/100764 describes a device for carrying out noise control in a motor vehicle. The device has a hollow body that is divided into at least two spaces by a sound transmitting device. One space is connected via an input line to a gaseous part of an internal combustion engine of the vehicle, and the other space is coupled acoustically by an output line to an interior of the vehicle and/or to the space surrounding the vehicle. The output line also has at least one branch from which at least two branch lines run at different locations in the vehicle interior and/or the space surrounding the vehicle.

An object of the invention to create a suitable acoustic profile for an electric vehicle or a hybrid vehicle that takes into account different noise sources and supplies an authentic vehicle sound that can be used independently of a driving mode. In this context, the external noise of a vehicle is also of particular importance alongside the frequently considered internal noise. The invention simply and efficiently solves the problems of external noise and internal noise as well as simply and efficiently manipulating the noise in the interior of a motor vehicle and simulating an engine noise that is not present when a hybrid vehicle is driven electrically.

SUMMARY OF THE INVENTION

The invention relates to a method for generating noise in the interior and exterior of a motor vehicle. The method of the invention provides a control unit that can be activated and that is operatively connected to a noise generator. The noise generator is connected to at least one noise emitting device. The noise emitting device preferably is mounted underneath a hood of the motor vehicle and is connected to the interior of the motor vehicle via at least one hose line which that has at least one sound transmitting element. Thus, sound waves are extracted from the noise emitting device and are transmitted into the vehicle interior.

Purely electrically driven vehicles are virtually without sound. Thus, a noise generator and a noise emitting device are provided to ensure driving safety. The noise emitting device is arranged under a hood of the motor vehicle in such a way that sound waves are emitted approximately in the direction of travel of the vehicle. As a result, a desired sound is produced outside the motor vehicle. Sound waves also are directed by the noise emitting device into the region of the interior of the vehicle via the hose. Sound waves also would be directed into the interior of the vehicle without the hose due to normal emission characteristics. However, low-frequency and medium-frequency components of the sound waves would be missing or would be highly attenuated. As a result, sound in the interior of the vehicle would appear less powerful and virtually without an emotional effect and would differ significantly from the sound outside the vehicle. The at least one hose of the invention provides a connection between the noise emitting device and the vehicle interior to extract sound waves from the noise emitting device.

The at least one hose may have a branch at which the extracted sound waves are directed into two hoses that are separate from one another.

In a further embodiment of the method according to the invention. One of the two hoses may be guided into a left A pillar of the vehicle, and the other hose may be guided into a right A pillar of the vehicle. The two hoses may be guided from the branch on both sides in the region of a respective wheel housing and through a respective end wall region and may be connected in a lower region of the respective A pillar.

The transmission of sound waves through a hose line enables low-frequency and medium-frequency components of the sound waves to be heard in the interior of the vehicle. As result, a powerful and authentic sound is produced in the interior of the vehicle without influencing the sound outside the vehicle.

The noise emitting device preferably is a loudspeaker arranged in a loudspeaker box. The loudspeaker may be inserted into an underside of the loudspeaker box so that sound waves are irradiated primarily in the direction of the engine compartment as well as in the direction of travel.

The control unit preferably is activated as a function of driving state variables, for example a current velocity. The activated control unit generates a signal that is passed to the noise generator and triggers the noise generator to generate noise corresponding to the signal and to pass the noise to the noise emitting device.

The noise emitting device may also include a solid-borne sound actuator for excitation over an area.

The loudspeaker in the loudspeaker box emits sound into the engine compartment region. Further propagation of sound then takes place with a primary orientation in the direction of travel to achieve the desired sound with the objectives of warning pedestrians and sound design. Connecting a hose to the loudspeaker box enriches the internal noise in a targeted fashion via the loudspeaker.

The noise generator retrieves noises from a noise carrier, converts the noises into noise information and directs the noises to the noise emitting device.

The noise preferably is digitized noise, sounds or tones of different frequencies. The noise carrier is, for example, a nonvolatile memory element, a compact disk or a digital tape. Noises that are available for selection are stored in a retrievable fashion on the noise carrier.

A first switching element may be provided and can be used to interrupt the connection between the noise generator and the noise emitting device, thereby switching of the noise irradiation by the noise emitting device. A second switching element may be provided and can be used to interrupt the at least one hose, thereby switching off the sound irradiation from the noise emitting device into the vehicle interior. Thus, noise emission generated by the noise generator can be suppressed entirely or noise emission through the hose line into the vehicle interior can be switched off.

Freely selectable driving noise of a vehicle may be imitated with the noise generator and irradiated via the noise emitting device.

In the case of a hybrid vehicle with an internal combustion engine, an intake section of the internal combustion engine may be connected to the interior of the motor vehicle via a branch in the at least one hose. As a result, pressure fluctuations that are excited by aspiration of the internal combustion engine in the form of sound waves are radiated into the hose in addition to the extracted sound waves. Thus, the vehicle interior receives a combination of the noise generated by the internal combustion engine and the noise generated by the noise generator. As a result, the noise generated by the internal combustion engine can be manipulated intentionally. A further switching element can be provided to interrupt the hose in the direction of the noise emitting device when driving a hybrid vehicle with the internal combustion engine so that only noises from the internal combustion engine are directed into the vehicle interior. However, the line that is branched off from the hose and that leads to the internal combustion engine or to the intake section can be switched on or off by a switching element. Thus, only noise from the noise emitting device or a combination of the two types of noise can enter the vehicle interior.

The phrase formulation "operatively connected" as used herein means suitable information transmitting means are provided to transmit corresponding information between the units that are operatively connected.

A further noise emitting device, such as an internal loudspeaker that can once more amplify the noise that is to be emitted can be provided in addition to the hose leading into the vehicle interior. In addition, the noise that is to be emitted into the vehicle interior again can be manipulated here.

The volume of sound waves that are emitted can be varied by a regulator.

The invention also relates to a device for generating noise in the interior and exterior of a motor vehicle.

The device of the invention comprises a control unit that can be activated, a noise generator and at least one noise emitting device. The control unit preferably is connected operatively to the noise generator, and the noise generator in turn is connected to the at least one noise emitting device. The noise emitting device can be a loudspeaker unit that is mounted underneath a hood of a motor vehicle and is connected to the vehicle interior of the motor vehicle via at least one hose that is provided with at least one sound transmitting element. As a result, sound waves extracted from the noise emitting device can be transmitted into the vehicle interior.

The device of the invention preferably is configured to carry out the method of the invention.

The invention also relates to the use of the device and/or of the method of the invention in a motor vehicle having an electric drive, namely, a hybrid vehicle, a plug-in hybrid or a vehicle with purely electric drive. The use of the device of the invention is also possible in a motor vehicle with an internal combustion engine and without an electric drive to modify noises of the internal combustion engine in a targeted fashion.

The noise generator may provide different types of noise for selection so that a large spectrum of sounds and noise can be covered.

The device of the invention may be arranged in a hybrid vehicle and is correspondingly used there.

Further details and refinements of the invention can be found in the detailed description and the appended drawings.

Of course, the features that are specified above and/or explained below can be used not only in the specified combination, in other combinations or alone without departing from the scope of the invention.

The invention is illustrated schematically on the basis of embodiments in the drawings and is described in detail with reference to the drawings.

DETAILED DESCRIPTION OF THE PREFERRED EMBODIMENTS

Figure 1:
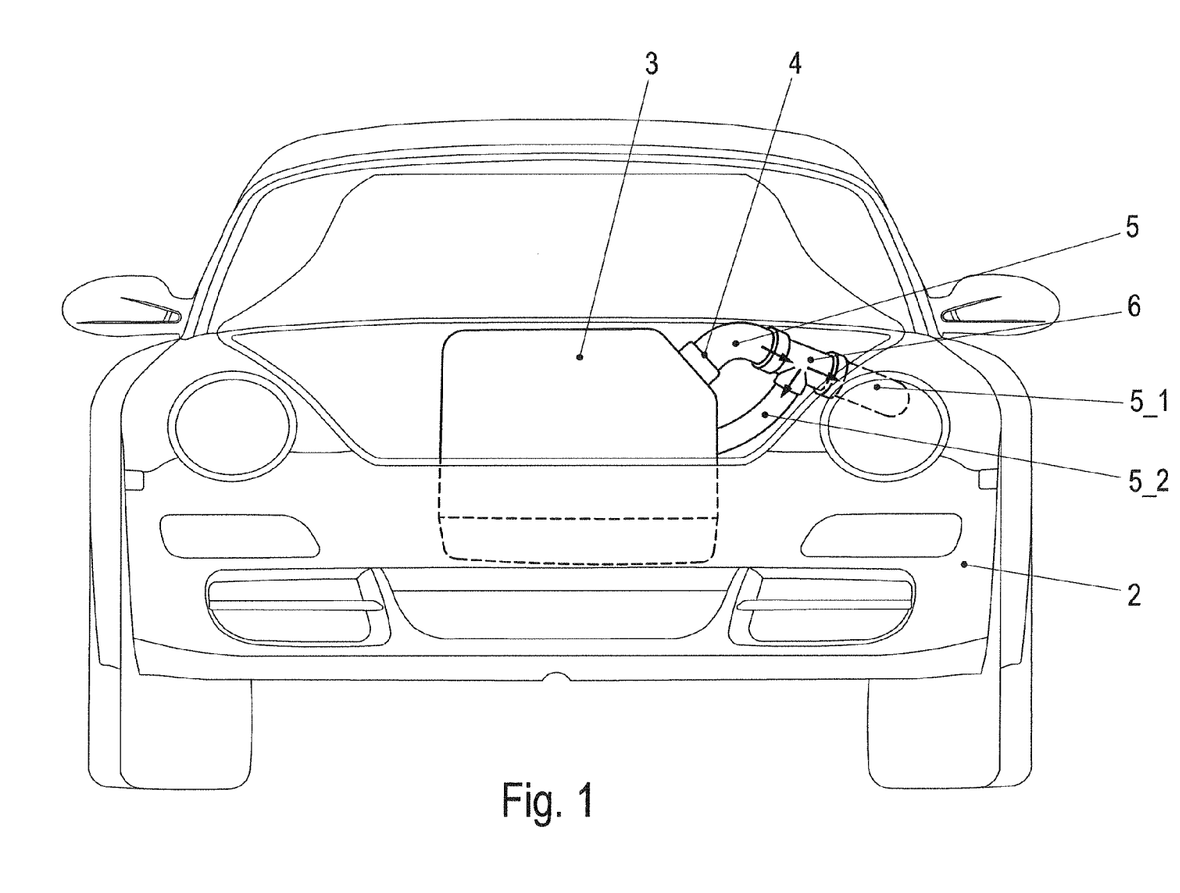
FIG. 1 is a schematic illustration of a front view of a front region of a motor vehicle in which an embodiment of a device of the invention is installed.

FIG. 1 is a front view of a front region of a motor vehicle and illustrates an engine region of the motor vehicle underneath a hood which is illustrated folded open here is shown. A noise emitting device 3 is arranged above a bumper 2. The noise emitting device 3 can be a loudspeaker system composed of a loudspeaker box and a loudspeaker in the loudspeaker box. The loudspeaker box is connected to a noise generator (not shown here). In addition, the loudspeaker box has a connection 4 via which a hose 5 is coupled to the loudspeaker box 3. In the illustration shown here, the hose 5 has a Y-branch 6 at which the hose line 5 is divided into hose lines 5_1 and 5_2 that are separate from one another. Thus, sound waves that are extracted from the loudspeaker box 3 are led through the hose 5 and are directed at the branch 6 into the two hose lines 5_1 and 5_2. As is shown in FIG. 2, the hoses 5_1 and 5_2 extend on the left and on the right sides of the motor vehicle from the front region into a vehicle interior.

Figure 2:
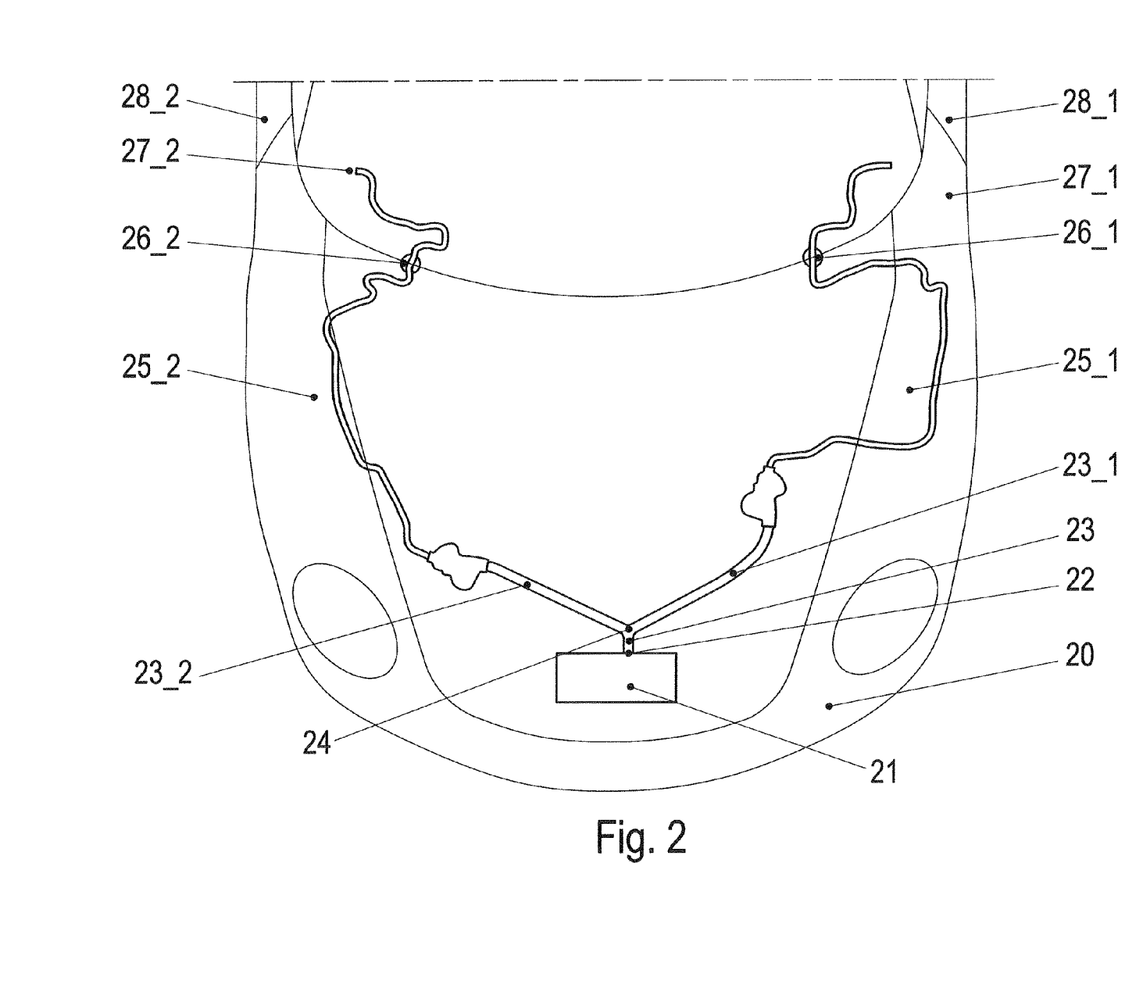
FIG. 2 is a schematic illustration of a plan view of a front region or engine region of a motor vehicle in which a further embodiment of the device of the invention is arranged.

FIG. 2 is a plan view of a front region of a motor vehicle and shows a bumper 20 and a noise emitting device 21 with a hose connection 22 to which a hose 23 is connected. The hose 23 is divided at a branch 24 into two hoses 23_1 and 23_2. The hose 23_1 runs on the right side, when viewed from the front, in the region of a right wheel housing 25_1, is led through an end wall region 26_1 and then is connected to a lower region 27_1 of the right A pillar 28_1. The same profile is present on the left side for the hose line 23_2, which is guided in the region of a left wheel housing 25_2, is led through a left end wall region 26_2 and is connected to a lower region 27_2 of the left A pillar 28_2.

Figure 3A:
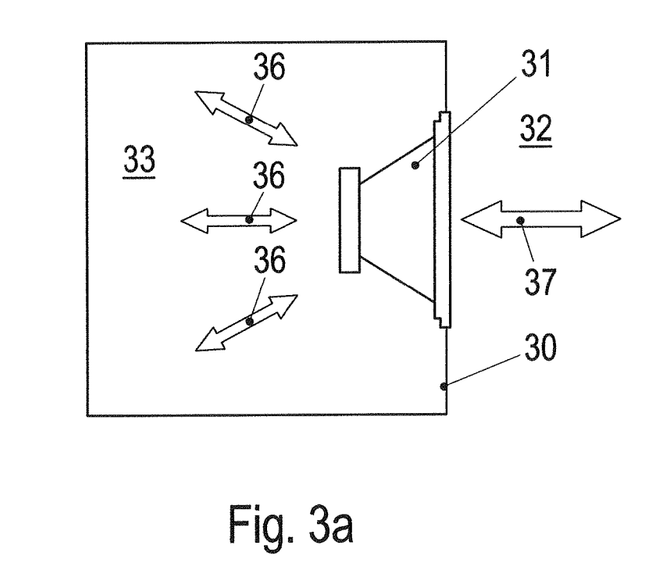
FIGS. 3a and 3b are schematic illustrations of side views of another embodiment of the device of the invention.

FIG. 3a shows a noise emitting device without a connection for a hose line. The noise emitting device is a closed housing 30 in which a loudspeaker 31 is arranged. Noise emission takes place only into the exterior region 32, as indicated by the double arrow 37, and into the interior region 33 of the closed housing 30, as indicated by double arrows 36.

Figure 3B:
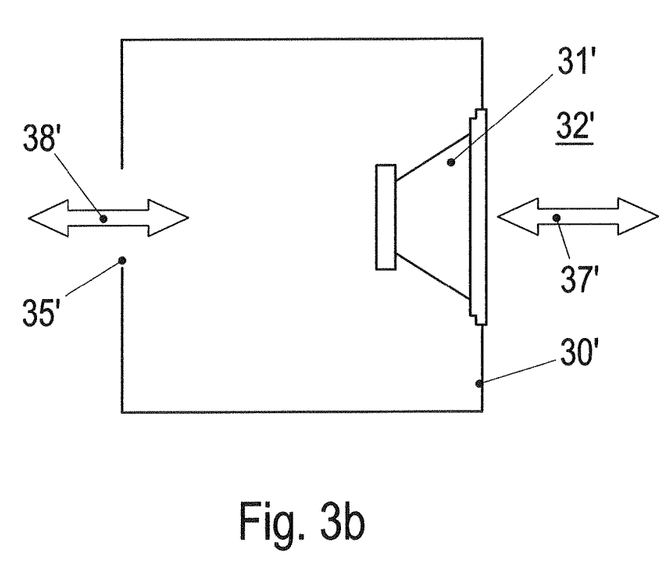

In contrast, FIG. 3b shows a noise emitting device in the form of an open housing 30' in which a loudspeaker 31' is arranged. The open housing 30' also has a connection 35' for a hose line (not shown). The connection 35' makes the housing 30' an open housing, unlike the closed housing 30. Thus, noise emission no longer takes place only into the exterior region 32', as indicated by the double arrow 37', but also in the direction of the hose line, as indicated by the arrow 38'.

Figure 4:
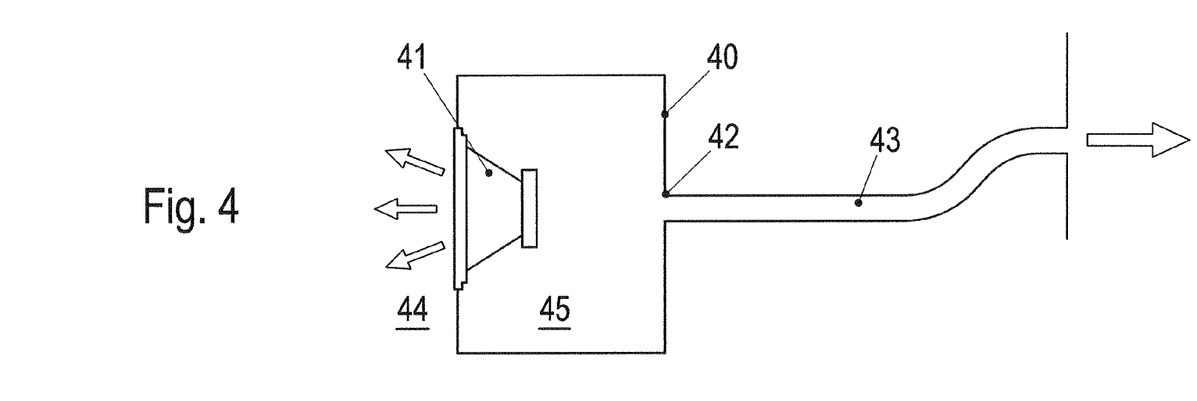
FIG. 4 is a schematic illustration of a side view of a further embodiment of the device of the invention.

FIG. 4 shows a further embodiment of the device according to the invention. A loudspeaker box 40 with a loudspeaker 41 inserted therein is shown as a noise emitting device. The loudspeaker box 40 has a connection 42 for a hose 43. The hose 43 is led to the vehicle interior of a motor vehicle which is not illustrated here. The loudspeaker 41 emits sound waves that are guided both to the exterior region 44 and into the interior region of the loudspeaker box 45 and as a result also in the direction of the hose line 43. As a result, the extracted sound waves ultimately are directed into the vehicle interior of the motor vehicle.

The hose line 43 can have a switching unit that makes it possible to interrupt the connection to the vehicle interior so that sound waves optionally are not transferred into the vehicle interior by the loudspeaker box or the loudspeaker arranged therein.

Figure 5:
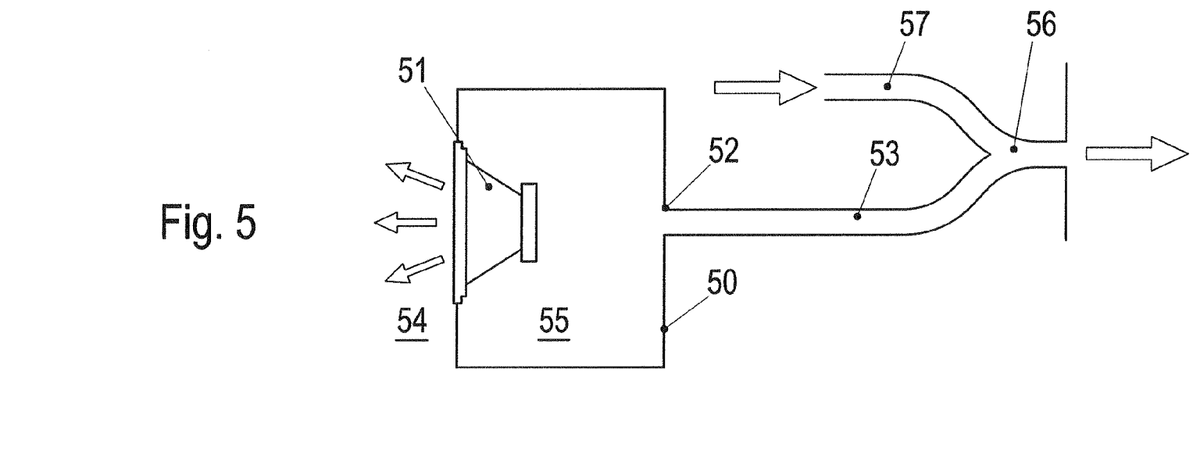
FIG. 5 shows a schematic illustration of a side view of yet another embodiment of the device of the invention.

FIG. 5 shows a further embodiment of the invention with a loudspeaker box 50 and a loudspeaker 51 arranged therein. The loudspeaker box 50 has a connection 52 at which a hose 53 is led off in the direction of the vehicle interior of a motor vehicle (not illustrated here). The hose 53 has a branch 56 from which a branched hose 57 leads to an intake section of an internal combustion engine. This structure makes it possible that both extracted sound waves from the loudspeaker 51 and sound waves from the intake section pass via the branched line 57 into the vehicle interior of the motor vehicle. These sound waves are superimposed in the vehicle interior and a resulting sound is produced. Switching units may be provided to connect the hose line at suitable locations depending on requirements and the driving mode so that only sound waves from the intake section, only sound waves from the loudspeaker box or both pass in into the vehicle interior.

Figure 6:
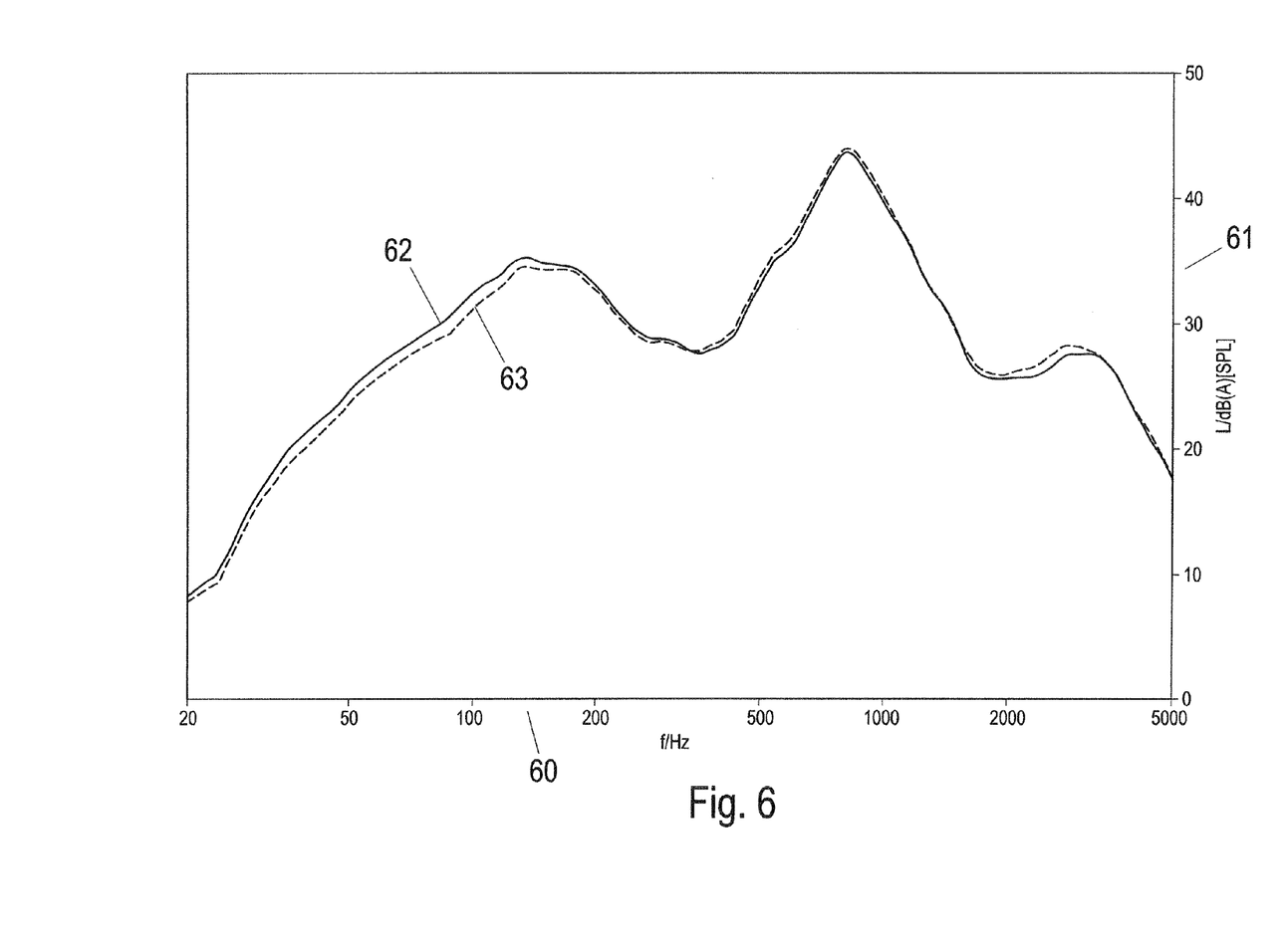
FIG. 6 is a graphic illustration of the profile of external noise for a motor vehicle with and without a hose line to the vehicle interior, which is to be provided according to the invention.

FIG. 6 illustrates the volume or the level L of exterior noise in various frequency ranges that is generated by an exterior loudspeaker or a noise emitting device in the region of the hood of the motor vehicle. Frequency is plotted in Hertz (Hz) on an abscissa 60. The volume or the level L is plotted in decibels (dB) on an ordinate 61. Exterior noise was picked up by a microphone installed in front of a motor vehicle that has a noise emitting device in the front region, at a distance of approximately 2 m and at a height of approximately 1.5 m. A sine sweep, i.e. a periodic signal that changes frequency from a starting value to an end value in a defined time, was selected as the excitation signal. In the present case, 20 Hz was selected as the starting value and 5 kHz as the end value. The change in the frequency from the starting value to the end value took place with a time increment of $\Delta t = 30$ s. The curve 62 shows the profile of the exterior noise generated by the noise emitting device on the basis of the excitation signal without the noise emitting device being connected to a hose line that leads to the vehicle interior. The noise emitting device is a loudspeaker arranged in a loudspeaker box forming a closed housing as in FIG. 3a.

The curve 63 then shows the profile of the exterior noise plotted against the frequency for the case in which a hose line, which leads into the vehicle interior of the motor vehicle, is connected to the loudspeaker box. By connecting a hose line, the previously closed housing structure is made into an open system. In this context, possible effects such as a change in the emitted frequency spectrum can occur. However, as can be seen here, the curve 63 largely follows the curve 62, with the result that the exterior noise does not appear to be affected adversely by the hose line and extraction of sound waves from the loudspeaker box associated therewith.

Figure 7:
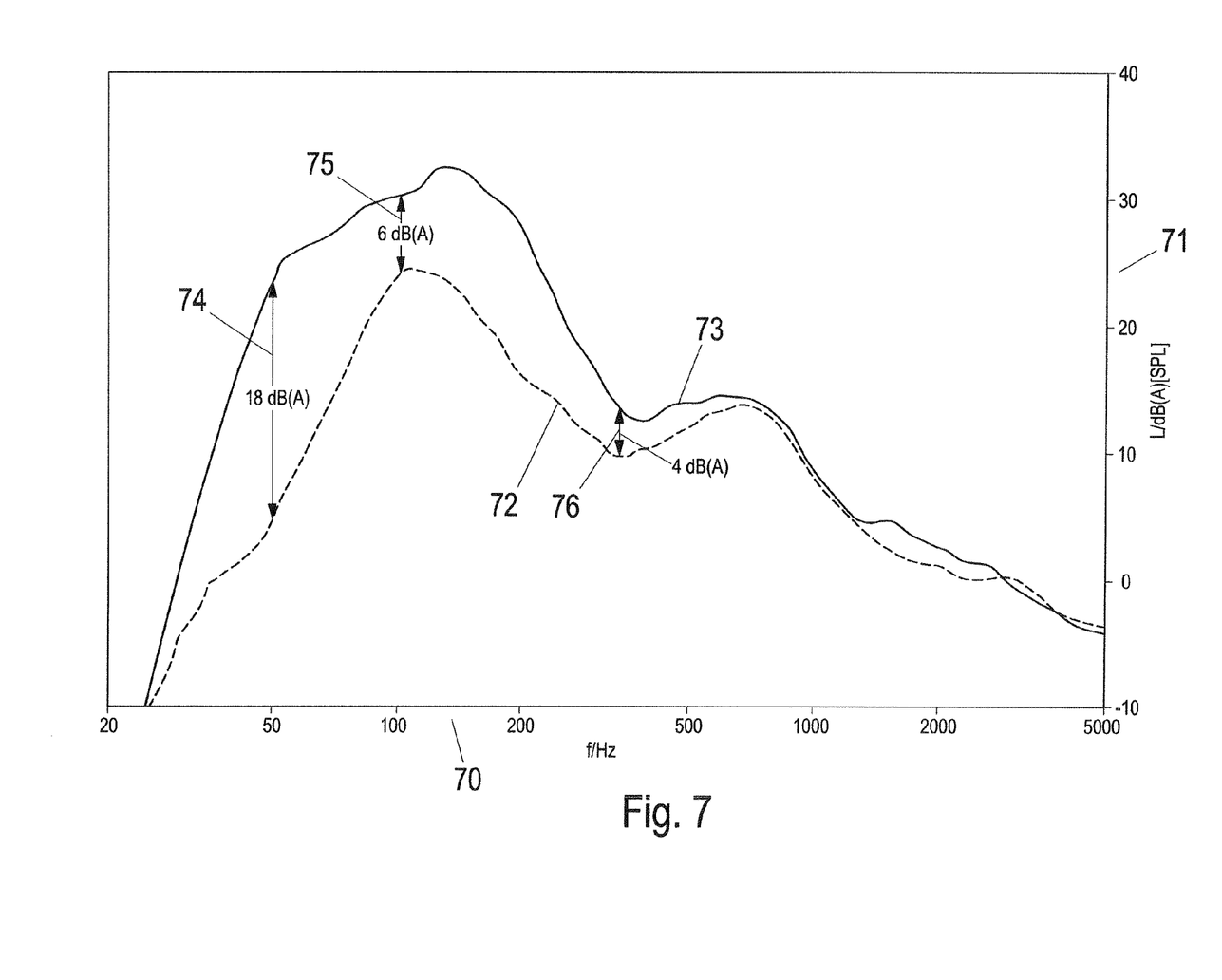
FIG. 7 is a graphic illustration of an interior noise profile with and without a hose of the invention between the noise emitting device and the vehicle interior.

FIG. 7 shows the profile of noise in the interior of a motor vehicle over a specific frequency range. The volume or the level L is specified in decibels (dB) on an ordinate 71. The frequency is plotted in Hertz (Hz) on an abscissa 70. A curve 72 shows the interior noise that can be perceived in the vehicle interior of a motor vehicle is plotted for the case in which, as explained in FIG. 6, a noise emitting device is provided in the front region of the motor vehicle to generate a suitable exterior noise. This noise emitting device is not connected to the vehicle interior of the motor vehicle via a hose. Thus, noise generated by the noise emitting device is directed partially as sound waves into the region of the vehicle interior of the motor vehicle. However, for structural reasons, characteristic low-frequency and medium-frequency components of the sound waves are missing or at least attenuated. As a result, the component that can be heard in the vehicle interior is described as less powerful and with a smaller emotional effect.

The profile 73 shows interior noise for the case in which the noise emitting device, such as a loudspeaker box, is connected via a hose to the vehicle interior. It is apparent that, in the low-frequency and medium-frequency range, a clear difference in volume can be perceived between the two profiles 72 and 73. The difference is strongest in the low-frequency range such as, for example, at a frequency of 50 Hz, as indicated by the double arrow 74. Here, a difference of 18 dB was measured. In the region of a frequency of 100 Hz there is also a difference of 6 dB, as indicated by the double arrow 75, and in the region of approximately 400 Hz there is a difference of approximately 4 dB, as indicated by the double arrow 76. The higher the frequency, the lower the deviations between the profiles 72 and 73. However, it is clearly apparent that the hose from the noise emitting device into the vehicle interior significantly improves interior noise and provides noise that can be perceived better. As a result, the hose enriches interior noise in a targeted fashion. To measure interior noise, in the present case a plastic head was provided in the vehicle interior to perform the measurements of the vehicle interior. Otherwise, the measuring conditions with respect to the excitation signal would be the same as those which used as the basis for FIG. 6.

Figure 8:
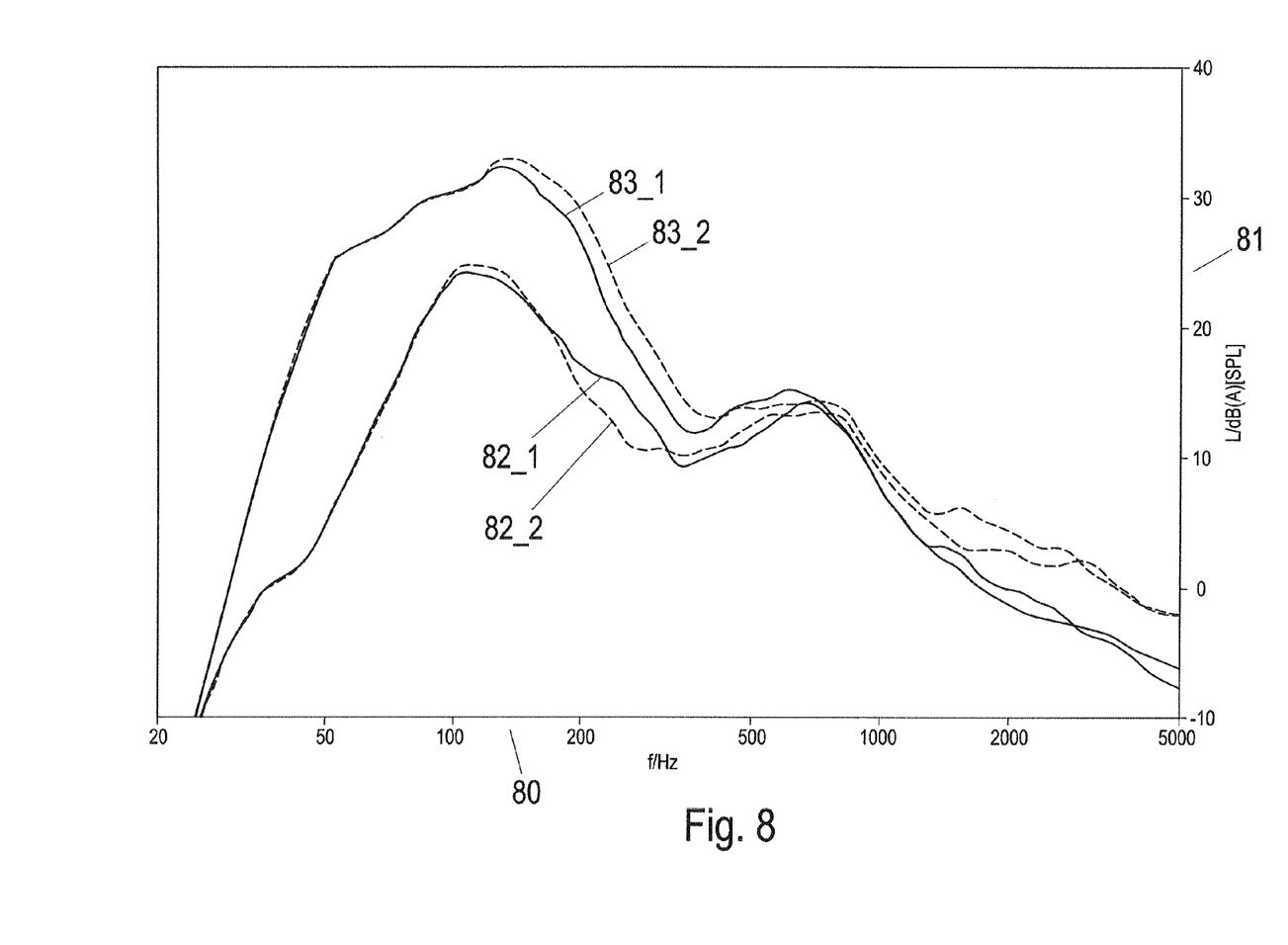
FIG. 8 is a graphic illustration of an interior noise profile with local differentiation, also with and without a hose to the vehicle interior.

FIG. 8 shows, under the same test conditions as in FIGS. 6 and 7, the profile of an interior noise taking into account various regions of the vehicle interior, wherein here essentially the left and right regions have been considered separately from one another. The frequency in the range of 20 Hz to 5 kHz is plotted on an abscissa 80 and the volume or the level is plotted in decibels on an ordinate 81. The curves 82_1 and 82_2 each represent the profile of the interior noise without a hose line between the noise emitting device in the front region of the motor vehicle and the vehicle interior. In this context, the curve 82_1 describes the profile of the interior noise in the left region of the vehicle interior, and the curve 82_2 describes the interior noise in the right region of the vehicle interior. In contrast, the curves 83_1 and 83_2 show the profile of the interior noise when a hose line is provided between the noise emitting device in the front region of the motor vehicle and the vehicle interior. It is also clear again that in the low-frequency and medium-frequency range there is a considerable difference between the respective curves 82 and 83. The curve 83_1 describes the profile of the noise in the left region, while the curve 83_2 indicates the profile of the interior noise in the right region. It is apparent that in the range from 120 to 400 Hz the difference between the curves 82_2 and 83_2 is somewhat larger than the difference between the corresponding curves 82_1 and 83_1. This means that the difference in noise in the right region between providing a hose line and without a hose line is somewhat greater than in the left region. The interior noise was also measured again here with a plastic head in the vehicle interior.

From FIGS. 6 to 8 it is clear that the hose between the noise emitting device and the vehicle interior exhibits clear effectiveness in the frequency range between 25 Hz and 550 Hz. In addition, the overall noise pattern directs air-borne sound and the introduced air-borne sound appears authentic. There is no orientation or localization in the region of the respective A pillars to which the respective hose lines are coupled due to the low frequency range, but instead there is a uniform sound pattern. In addition it is apparent (see FIG. 6) that the exterior noise is not influenced by the provision of the hose line. It is also advantageous that it is not necessary to have a further control apparatus or an actuator for enrichment of the interior noise.

What is claimed is:

1. A method for generating noise at an interior and exterior of a motor vehicle, the method comprising:
    operating a control unit to send a control signal to a noise generator;
    activating the noise generator upon receipt of the control signal to send a noise signal to a single noise emitting device located under a hood of the motor vehicle and in proximity to a front bumper of the vehicle;
    operating the noise emitting device upon receipt of the noise signal to produce sound waves in proximity to the front bumper that are imitative of driving noise of the vehicle;
    extracting at least some of the sound waves produced by the single noise emitting device; and
    directing the extracted sound waves through first and second hoses and to separate locations in the interior of the vehicle.

2. The method of claim 1, further comprising emitting sound waves from the first hose at a left A pillar of the motor vehicle and emitting sound waves from the second hose at a right A pillar of the motor vehicle.

3. The method of claim 2, wherein the step of emitting sound waves at the A pillars comprises emitting sound waves at lower regions of the respective A pillars.

4. The method of claim 1, wherein the noise emitting device is a loudspeaker arranged in a loudspeaker box.

5. The method of claim 4, wherein the step of operating the noise emitting device comprises irradiating the sound waves primarily toward an engine compartment and in a direction of travel.

6. The method of claim 1, wherein operating the control unit to send the control signal to the noise generator is carried out as function of current velocity.

7. The method of claim 1, wherein the step of activating the noise generator comprises retrieving noises from a noise carrier, converting the retrieved noises into noise information and directing the noise information to the noise emitting device.

8. The method of claim 7, the noise carrier is a nonvolatile memory element, a compact disk or a digital tape, and the method further comprising digitizing noise, sounds or tones of different frequencies.

9. The method of claim 1, further comprising interrupting the noise signal between the noise generator and the noise emitting device, and thereby switching off noise irradiation by the noise emitting device.

10. The method of claim 1, further comprising interrupting the at least one hose, and thereby switching off sound irradiation into the interior of the motor vehicle.

11. The method of claim 1, further comprising selecting a driving noise that is to be imitated by the noise generator and irradiated by the noise emitting device.

12. A method for generating noise at an interior and exterior of a motor vehicle, the method comprising:
   operating a control unit to send a control signal to a noise generator;
   activating the noise generator upon receipt of the control signal to send a noise signal to a noise emitting device located under a hood of the motor vehicle;
   operating the noise emitting device upon receipt of the noise signal to produce sound waves;
   extracting at least some of the sound waves produced by the noise emitting device; and
   directing the extracted sound waves through at least one hose and to the interior of the vehicle, wherein,
   an intake section of an internal combustion engine is connected to the vehicle interior via a branch in the hose, with a result that pressure fluctuations that are excited by aspiration of the internal combustion engine in the form of sound waves are radiated into the hose line in addition to the extracted sound waves.

13. A device for generating noise at an interior and an exterior of a motor vehicle, comprising: a control unit that can be activated; a noise generator operatively connected to the control unit; a single noise emitting device operatively connected to the noise generator, the noise emitting device being mounted underneath a hood of the motor vehicle in proximity to a front bumper of the vehicle and being operative to generate sound waves; and first and second hoses with at least one sound transmitting element, the hoses providing communication between the single noise emitting device and first and second locations in the vehicle interior so that at least some of the sound waves from the noise emitting device are transmitted into the interior of the motor vehicle.

14. The device of claim 13, wherein the noise emitting device is a loudspeaker arranged in a loudspeaker box.

15. The device of claim 14, wherein the loudspeaker is inserted into an underside of the loudspeaker box and oriented for irradiating the sound waves primarily in a direction of travel.

16. The device of claim 13, further comprising a branch in the hose connecting an intake section of an internal combustion engine to the vehicle interior so that pressure fluctuations that are excited by aspiration of the internal combustion engine in the form of sound waves are radiated into the hose line in addition to the sound waves from the noise emitting device.

* * * * *